(12) United States Patent
Araki et al.

(10) Patent No.: US 9,848,261 B2
(45) Date of Patent: Dec. 19, 2017

(54) APPARATUS FOR REMOVING HOWLING AND METHOD FOR REMOVING HOWLING

(71) Applicant: Panasonic Intellectual Property Management Co., Ltd., Osaka (JP)

(72) Inventors: Junji Araki, Osaka (JP); Hiromasa Ohashi, Osaka (JP); Naoya Tanaka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/485,434

(22) Filed: Apr. 12, 2017

(65) Prior Publication Data

US 2017/0223454 A1 Aug. 3, 2017

Related U.S. Application Data

(63) Continuation of application No. PCT/JP2015/005134, filed on Oct. 9, 2015.

(30) Foreign Application Priority Data

Oct. 17, 2014 (JP) ................. 2014-212213

(51) Int. Cl.
H04B 15/00 (2006.01)
H04R 3/02 (2006.01)
H04R 3/04 (2006.01)

(52) U.S. Cl.
CPC ............. *H04R 3/02* (2013.01); *H04R 3/04* (2013.01)

(58) Field of Classification Search
USPC ..... 381/17, 66, 71.11, 71.8, 71.12, 93, 94.1, 381/309
See application file for complete search history.

(56) References Cited

U.S. PATENT DOCUMENTS 5,146,470 A 9/1992 Fujii et al.
6,201,866 B1 3/2001 Ariyama et al.
(Continued)

FOREIGN PATENT DOCUMENTS

JP 10-313269 11/1998
JP 2007-515820 6/2007
(Continued)

*Primary Examiner* — Yosef K Laekemariam
(74) *Attorney, Agent, or Firm* — Wenderoth, Lind & Ponack, L.L.P.

(57) ABSTRACT

A howling removing apparatus according to the present disclosure is a howling removing apparatus to be connected to a microphone and a speaker. The howling removing apparatus includes: a nonlinear converter that nonlinearly converts a sound signal input to the speaker and outputs a nonlinear signal; a delay unit that delays the sound signal by a fixed time and outputs a delay signal; a norm calculator that calculates a norm from the delay signal; a filter coefficient generator that, based on the nonlinear signal, the delay signal and the norm, generates an adaptive filter that simulates a transfer characteristic of a space where the sound signal is reproduced from the speaker and is returned to the microphone; a cancel signal generator that convolves the delay signal and the adaptive filter with each other and generates a cancel signal; and a subtracter that subtracts the cancel signal from the sound signal. When an average sound pressure level of the sound signal exceeds a threshold value, the filter coefficient generator initializes the adaptive filter, thereby sensing oscillation of the adaptive filter even when a positional relationship between the microphone and the speaker is dynamically changed, and returning an output to normal.

7 Claims, 6 Drawing Sheets

(56) References Cited

U.S. PATENT DOCUMENTS

| | | | |
|---|---|---|---|
| 2006/0140429 A1 | 6/2006 | Klinkby et al. | |
| 2006/0210091 A1* | 9/2006 | Okumura | H04R 3/02 381/71.11 |
| 2009/0067651 A1 | 3/2009 | Klinkby et al. | |
| 2011/0182439 A1* | 7/2011 | Sakurada | H04R 3/02 381/94.1 |
| 2014/0056423 A1 | 2/2014 | Nishikawa et al. | |

FOREIGN PATENT DOCUMENTS

| | | |
|---|---|---|
| JP | 2007-235848 | 9/2007 |
| JP | 2009-532924 | 9/2009 |
| JP | 4428247 | 3/2010 |
| WO | 2005/020632 | 3/2005 |
| WO | 2007/113282 | 10/2007 |

* cited by examiner

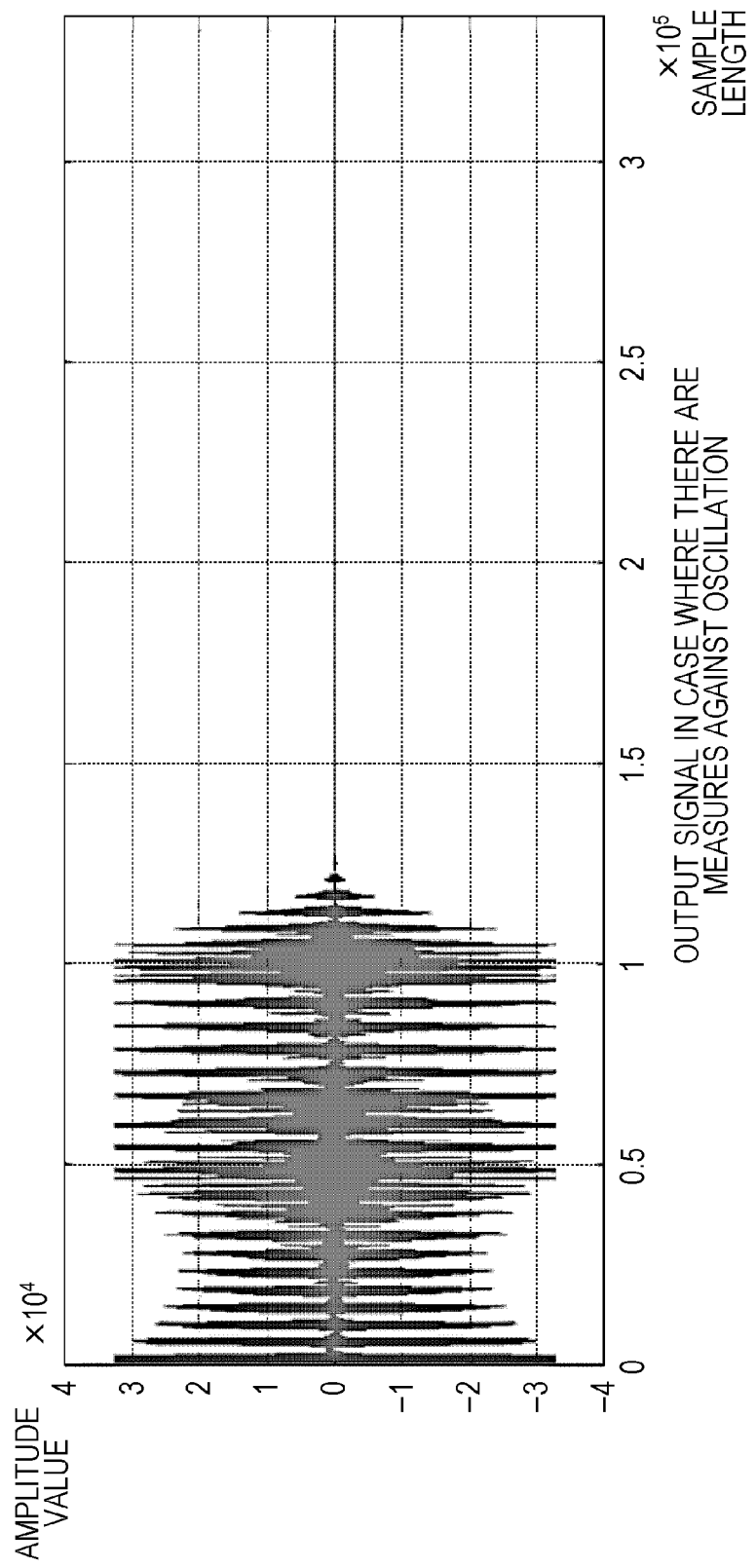

APPARATUS FOR REMOVING HOWLING AND METHOD FOR REMOVING HOWLING

BACKGROUND

1. Technical Field

The present disclosure relates to a howling removing apparatus and a howling removing method each of which prevents the howling with use of an adaptive filter.

2. Description of the Related Art

In an environment where a microphone and a speaker are located at positions close to each other, a sound signal picked up by the microphone is amplified and output from the speaker, and the output sound signal thus amplified is transferred through a space and is picked up again by the microphone, whereby an acoustic closed loop is formed. As a result, the sound signal output from the speaker and input to the microphone again is amplified repeatedly, whereby howling occurs.

There is known a technology, in order to prevent the howling that occurs as described above, for calculating an adaptive filter by estimating spatial transfer characteristics in a course where the sound signal, which is output from the speaker, is transferred through the space and is input to the microphone with use of an adaptive algorithm. In accordance with this technology, the obtained adaptive filter and the sound signal output from the speaker are convoluted with each other, whereby a signal that simulates a speaker output transferred through the space is obtained. This simulation signal is subtracted from the sound signal picked up by the microphone, whereby it becomes possible to remove only the speaker output, which is transferred through the space and is input to the microphone to cause the howling, and as a result, such an occurrence of the howling can be prevented.

In the adaptive algorithm that updates the adaptive filter with use of an output of a system, which is changed from moment to moment, the adaptive filter sometimes oscillates depending on a state of the output. When the adaptive filter oscillates, a failed abnormal signal (for example, a noise signal always having maximum amplitude) is output irrespective of a magnitude of an input signal. Moreover, since there is always some value in the adaptive filter, an output signal does not become 0, and the abnormality signal continues to be output even if the input signal stops.

In order to prevent such oscillation of the adaptive filter, a fail-safe function is generally implemented in a system using the adaptive algorithm. For example, Japanese Patent No. 4428247 discloses; a method of calculating a sound pressure level of an input signal and a sound pressure level of an output signal, and initializing an adaptive filter when a difference therebetween exceeds a threshold value, thereby restoring an output to normal; and a method of initializing an adaptive filter when a difference between such an un-updated adaptive filter and such an updated adaptive filter, both of which represent a correction amount of the adaptive filter, exceeds a threshold value, thereby restoring an output to normal.

SUMMARY

The present disclosure provides a howling removing apparatus and a howling removing method each of which is capable of sensing an oscillation of an adaptive filter even when a positional relationship between a microphone and a speaker is dynamically changed, and of restoring an output to normal.

A howling removing apparatus according to a first exemplary embodiment in accordance with the present disclosure is a howling removing apparatus to be connected to a microphone and a speaker. The howling removing apparatus includes: a nonlinear converter that nonlinearly converts a sound signal input to the speaker and outputs a nonlinear signal; a delay unit that delays the sound signal by a fixed time and outputs a delay signal; a norm calculator that calculates a norm from the delay signal; a filter coefficient generator that, based on the nonlinear signal, the delay signal and the norm, generates an adaptive filter that simulates a transfer characteristic of a space where the sound signal is reproduced from the speaker and is returned to the microphone; a cancel signal generator that convolves the delay signal and the adaptive filter with each other and generates a cancel signal; and a subtracter that subtracts the cancel signal from the sound signal. When an average sound pressure level of the sound signal exceeds a threshold value, the filter coefficient generator initializes the adaptive filter, and can thereby sense oscillation of the adaptive filter even when a positional relationship between the microphone and the speaker is dynamically changed, and return an output to normal.

A howling removing apparatus according to a second exemplary embodiment in accordance with the present disclosure is a howling removing apparatus to be connected to a microphone and a speaker. The howling removing apparatus includes: a nonlinear converter that nonlinearly converts a sound signal input to the speaker and outputs a nonlinear signal; a delay unit that delays the sound signal by a fixed time and outputs a delay signal; a norm calculator that calculates a norm from the delay signal; a filter coefficient generator that, based on the nonlinear signal, the delay signal output from the delay unit and the norm, generates an adaptive filter that simulates a transfer characteristic of a space where the sound signal is reproduced from the speaker and is returned to the microphone; a cancel signal generator that convolves the delay signal and the adaptive filter with each other and generates a cancel signal; and a subtracter that subtracts the cancel signal from the sound signal. When the norm exceeds a threshold value, the filter coefficient generator initializes the adaptive filter, and can thereby sense oscillation of the adaptive filter even when a positional relationship between the microphone and the speaker is dynamically changed, and return an output to normal.

Note that the present disclosure can be realized not only as an apparatus but also as a method in which processing means that composes the apparatus is used as a step, as a program for causing a computer to execute these steps, as a computer-readable CD-ROM that records the program therein, and as information, data or a signal, which indicates the program. Then, these program, information, data, and signal may be distributed via a communication network such as the Internet.

In accordance with the present disclosure, it is possible to provide a howling removing apparatus and a howling removing method each of which is capable of appropriately sensing the oscillation of the adaptive filter even when the positional relationship between the microphone and the speaker is dynamically changed, and of restoring the output to the normal.

BRIEF DESCRIPTION OF DRAWINGS

FIG. 6 is a graph showing a sound waveform of a speaker output signal when the howling removing apparatus according to the second exemplary embodiment is used.

DESCRIPTION OF EMBODIMENTS

Figure 1:
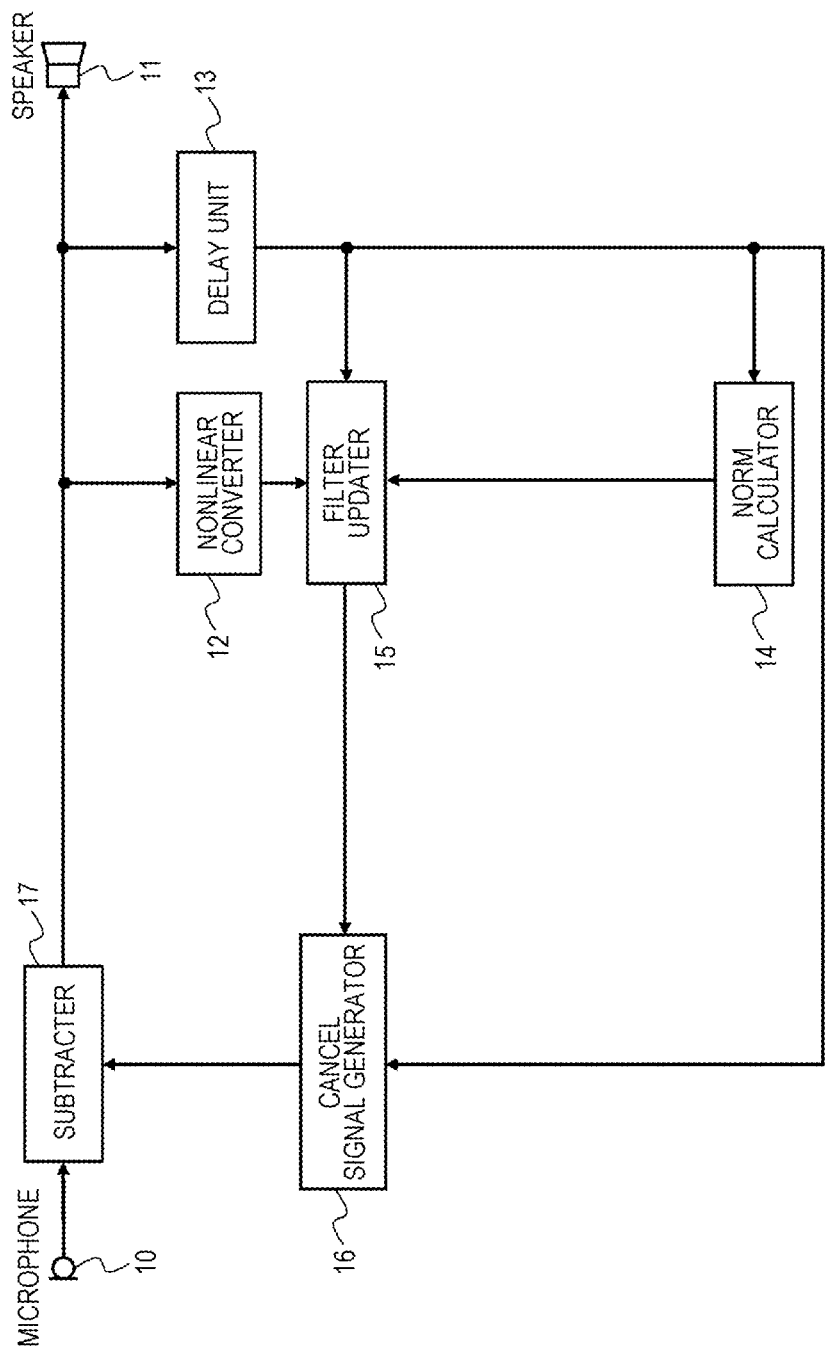
FIG. 1 is a block diagram showing a configuration of an ICA algorithm.

A description will be made below in detail of exemplary embodiments while referring to the drawings as appropriate. However, a description more in detail than necessary is omitted in some cases. For example, a detailed description of a well-known item and a duplicate description of substantially the same configuration are omitted in some cases. These omissions are made in order to avoid unnecessary redundancy of the following description and to facilitate the understanding of those skilled in the art.

Note that the inventor provides the accompanying drawings and the following description in order to allow those skilled in the art to fully understand the present disclosure, and does not intend to limit the subject matter, which is described in the scope of claims, by these drawings and description.

The present disclosure provides a howling removing apparatus and a howling removing method each of which appropriately senses an oscillation of an adaptive filter even when a positional relationship between a microphone and a speaker is dynamically changed, and restores an output to normal. In the following description, a first exemplary embodiment and a second exemplary embodiment will be described as examples which embody the technical idea of the howling removing apparatus and the howling removing method according to the present disclosure.

1. First Exemplary Embodiment

[1-1. Outline]

A howling removing apparatus and a howling removing apparatus according to the first exemplary embodiment use an average sound pressure level of a sound signal input to a speaker for oscillation sensing of an adaptive filter. Specifically, a filter coefficient generator, which generates an adaptive filter that simulates a transfer characteristic of a space where a sound signal input to a microphone is reproduced from the speaker and is returned to the microphone, initializes the adaptive filter when the average sound pressure level of the sound signal input to the speaker exceeds a threshold value. In this way, even when the positional relationship between the microphone and the speaker is dynamically changed, it becomes possible to appropriately sense the oscillation of the adaptive filter, and to restore the output to the normal.

A description will be made below of the first exemplary embodiment while referring to the drawings.

[1-2. Regarding ICA Algorithm Using Adaptive Filter Coefficient]

First, an independent component analysis (ICA) algorithm using an adaptive filter coefficient will be described. FIG. 1 is a block diagram showing processing of the ICA algorithm. As shown in FIG. 1, the ICA algorithm includes: nonlinear converter 12; delay unit 13; norm calculator 14; filter updater 15; cancel signal generator 16; and subtracter 17. Moreover, the processing of the ICA algorithm is connected to an input of microphone 10 and to an output of speaker 11.

The microphone input signal m[n] input to the ICA algorithm from microphone 10 is expressed by the following Expression (1.1).

[Expression 1]

$$m[n]=x[n]+e[n] \quad \text{Expression (1.1)}$$

Here, x[n] is a direct sound input signal. The direct sound input signal is a sound signal that is based on a sound generated from a sound source other than speaker 11. Further, e[n] is a sound signal as a result that an output from speaker 11 is transferred through a space and is recirculated back to microphone 10. That is, the microphone input signal m[n] is expressed as a signal in which the recirculated sound signal e[n] is superimposed on the direct sound signal x[n].

A signal obtained by estimating this recirculated sound signal e[n] by a predetermined arithmetic operation is defined as e1[n]. At this time, the recirculated sound signal e[n] included in the microphone input signal m[n] is removed by subtracting such an estimation signal e1[n] from the microphone input signal m[n]. This arithmetic operation of the subtraction is expressed by the following Expression (1.2) when the output signal in the ICA algorithm is defined as o[n].

[Expression 2]

$$o[n]=m[n]-e1[n]=x[n]+e[n]-e1[n] \quad \text{Expression (1.2)}$$

That is, if the estimation signal e1[n] is estimated to be equal to the recirculated sound signal e[n], then the recirculated sound signal e[n] can be removed from the microphone input signal m[n].

The output signal o[n] in the ICA algorithm is output from speaker 11. After being output from speaker 11, the output signal o[n] is transferred through the space, is returned to microphone 10 again, and is superimposed as the recirculated sound signal e[n] on the microphone input signal m[n]. That is, the recirculated sound signal e[n] is expressed by the following Expression (1.3).

[Expression 3]

$$e[n]=h[k]*o[n]=\Sigma_{k=0}^{S-1}(h[k]o[n-k]) \quad \text{Expression (1.3)}$$

Here, h[k] represents the transfer characteristic of the space, and Expression (1.3) is a convolution arithmetic operation of such a spatial transfer characteristics h[k] and the output signal o[n]. Hereafter, the convolution arithmetic operation will be represented by *. Moreover, S represents a tap length when the spatial transfer characteristics are expressed as a finite-length discrete representation filter coefficient. As shown in the following Expression (1.4), filter updater 15 obtains the estimation signal e1[n], which is obtained by estimating the recirculated sound signal e[n], by using an adaptive filter coefficient w[k] subjected to incremental learning.

[Expression 4]

$$e1[n]=w[k]*r[n-\tau]=\Sigma_{k=0}^{T-1}(w[k]r[n-\tau-k]) \quad \text{Expression (1.4)}$$

Here, r[n] is called a reference signal, and is a signal completely equivalent to the output from speaker 11. Further, τ is a delay amount in delay unit 13. That is, a reference signal r[n−τ] is equivalent to the output signal o[n] delayed by τ by delay unit 13. Moreover, T is a tap length of the adaptive filter coefficient w[k].

As seen from comparison between Expression (1.3) and Expression (1.4), if the output speech o[n] is used as a reference signal, and w[k] is estimated as an approximation of the spatial transfer characteristics h[k], then the estimation signal e1[n] obtained by estimating the recirculated sound signal e[n] can be obtained. Actually, o[n] is not directly used as a reference signal, but in consideration of a fixed delay amount caused by the system, a reference signal r[n−τ], which is equivalent to the output signal o[n] delayed by τ by delay unit 13, is used.

In order to perform approximation estimation for the spatial transfer characteristics h[k], filter updater 15 sequentially updates the adaptive filter coefficient w[k] with use of an ICA adaptive algorithm in accordance with the following Expression (1.5).

[Expression 5]

$$w_n[k] = w_{n-1}[k] + \Delta w[k] \qquad \text{Expression (1.5)}$$

Here, wn represents a filter coefficient estimated at a time n. Moreover, k represents a variable from 0 to T−1. A sequential update amount Δw is calculated by the following Expression (1.6):

$$\Delta w[k] = \alpha \frac{\phi(o[n])r[n-\tau-k]}{\sum_{i=0}^{T-1} |r[n-\tau-i]|} \qquad \text{Expression (1.6)}$$

Here, α represents a step width (a parameter for controlling an update amount per one time) in the update. Moreover, k represents a variable from 0 to T−1. A denominator of Expression (1.6) is a sum of absolute values of T samples in the reference signal r[n−τ], which are calculated in norm calculator 14. The denominator of Expression (1.6) serves to alleviate a fact that a filter update amount varies largely depending on a magnitude of the reference signal. Furthermore, φ in a numerator of Expression (1.6) represents a nonlinear signal obtained by implementing nonlinear conversion processing for the output signal o[n] in nonlinear converter 12. For example, as in a sign function, φ takes a value of 1 if a value of the output signal is positive, takes a value of −1 if the value of the output signal is negative, and takes a value of 0 if the value of the output signal is not either positive or negative. This φ signifies a determination as to whether or not a signal from which the recirculated sound signal is already removed has a correlation with the reference signal, and plays a role of changing the adaptive filter coefficient in a direction in which there is no correlation between the input signal and the output signal. As described above, the filter coefficient is sequentially updated, and when w[k] converges correctly, then a response to w[k] is approximate to h[k].

Cancel signal generator 16 convolves the adaptive filter coefficient w[k] thus calculated and the reference signal r[n−τ] with each other. In this way, cancel signal generator 16 obtains the estimation signal e1[n] of the recirculated sound signal e[n]. Subtracter 17 subtracts e1[n] from the microphone input signal m[n]. In this way, the recirculated sound signal e[n], which is a factor of the howling, is almost removed from the microphone input signal m[n], and the direct sound input signal x[n] is output from speaker 11.

[1-3. Configuration and Operation of Howling Removing Apparatus in First Exemplary Embodiment]

Figure 2:
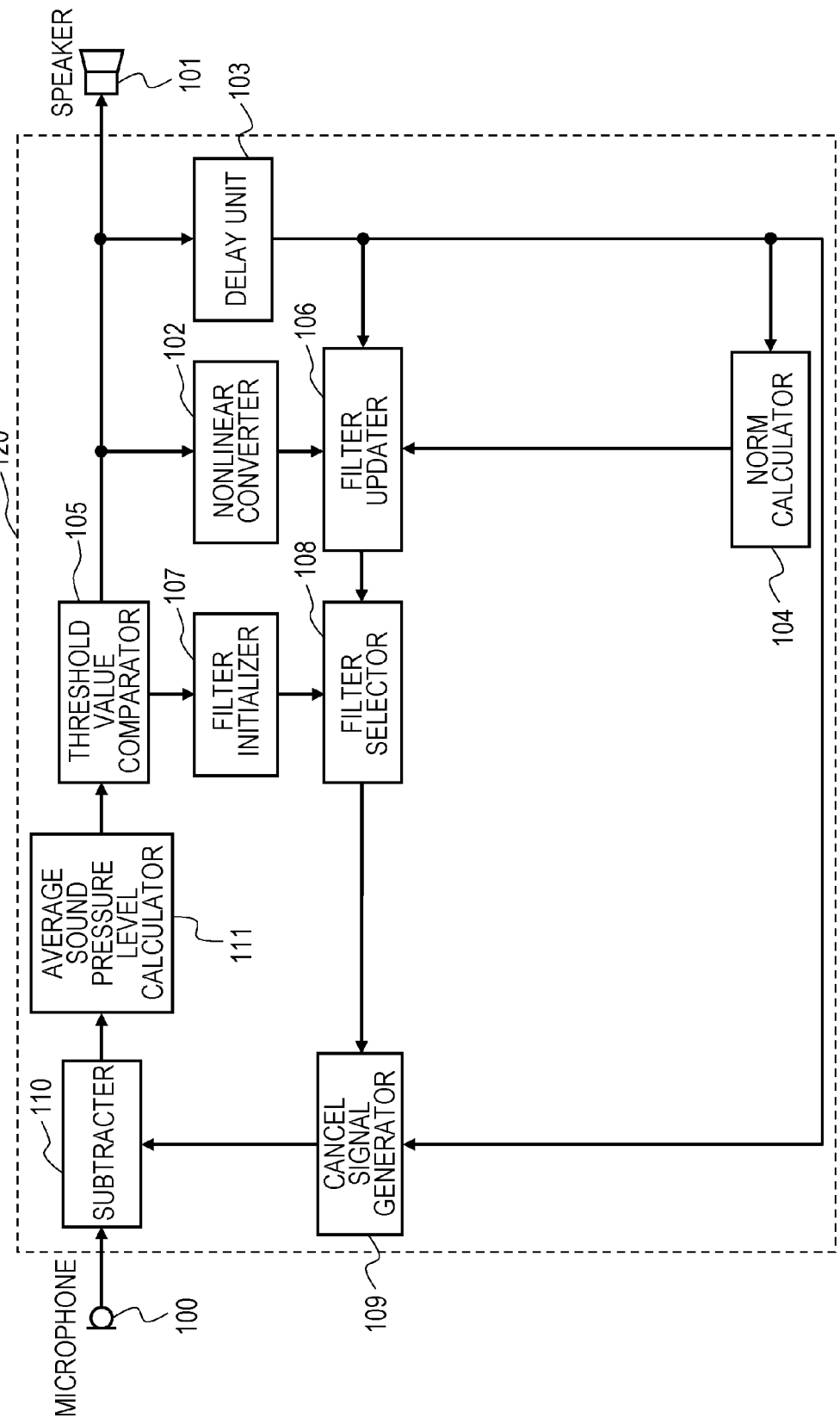
FIG. 2 is a block diagram showing a configuration of a howling removing apparatus in a first exemplary embodiment.

FIG. 2 is a block diagram showing a configuration of howling removing apparatus 120 in the first exemplary embodiment. Howling removing apparatus 120 includes: nonlinear converter 102; delay unit 103; norm calculator 104; threshold value comparator 105; filter updater 106; filter initializer 107; filter selector 108; cancel signal generator 109; subtracter 110; and average sound pressure level calculator 111, and is connected to microphone 100 and speaker 101. Nonlinear converter 102, delay unit 103, norm calculator 104, filter updater 106, cancel signal generator 109 and subtracter 110 correspond to nonlinear converter 12, delay unit 13, norm calculator 14, filter updater 15, cancel signal generator 16 and subtracter 17, which are constituents of the ICA algorithm shown in FIG. 1, respectively. That is, howling removing apparatus 120 has a configuration, which is added with threshold value comparator 105, filter initializer 107, filter selector 108 and average sound pressure level calculator 111 by applying the ICA algorithm.

The input signal m[n] of microphone 100 is input to subtracter 110. The signal (referred to as a speaker output signal) that has passed through subtracter 110 is input to average sound pressure level calculator 111. Average sound pressure level calculator 111 calculates an average sound pressure level per arbitrary unit time. Threshold value comparator 105 compares the average sound pressure level, which is calculated by average sound pressure level calculator 111, and a predetermined threshold value with each other. When the filter coefficient oscillates and an abnormal operation occurs, noise of maximum amplitude is continuously reproduced as the speaker output signal. Therefore, when the abnormal operation occurs, the average sound pressure level becomes substantially equal to a unit time average of an absolute value of the maximum amplitude. Meanwhile, also in a normal state, it is possible that the speaker output signal may momentarily take a maximum amplitude value; however, the speaker output signal does not take the maximum amplitude continuously for the unit time. Hence, it is desirable to set the threshold value to a value at which the speaker output signal can be regarded to be in an abnormal state.

Hereinafter, the case where the average sound pressure level is smaller than the threshold value and the case where the average sound pressure level is larger than the threshold value will be described separately. In the case where the average sound pressure level is smaller than the threshold value, threshold value comparator 105 outputs the speaker output signal.

Nonlinear converter 102 implements the nonlinear conversion processing for the speaker output signal, and thereafter outputs a nonlinear output signal. Delay unit 103 outputs a delay signal (hereinafter, referred to as a reference signal) given an arbitrary time delay to the speaker output signal. Norm calculator 104 calculates a norm, which represents a sum of absolute values in an arbitrary unit time, with respect to the reference signal output from delay unit 103. Filter updater 106 calculates a filter update value Δw[k], which is expressed by Expression (1.6), by using the nonlinear output signal output by nonlinear converter 102, the reference signal that is the output of delay unit 103, and the norm that is the output of norm calculator 104, and then updates the adaptive filter coefficient w[k] expressed by Expression (1.5).

Next, filter selector 108 selects the updated adaptive filter coefficient w[k]. Cancel signal generator 109 convolves the selected adaptive filter coefficient w[k] and the reference signal r[n−τ] with each other, thereby generating a cancel signal corresponding to the estimation signal e1[n] expressed by Expression (1.4).

Next, as expressed in Expression (1.2), subtracter 110 subtracts the cancel signal (estimation signal) e1[n] from the input signal m[n] of microphone 100. In this way, the recirculated sound signal e[n], which is input to microphone 100 as a result that the speaker output signal of speaker 101 is transferred through the space, is almost removed from the input signal m[n] of microphone 100, and the occurrence of the howling can be prevented.

Subsequently, the case where the average sound pressure level is larger than the threshold value in threshold value comparator 105 will be described. A fact that the average sound pressure level is larger than the threshold value means that the reference signal r[n−τ] has an abnormal value in the time unit for calculating the average sound pressure level. In this case, threshold value comparator 105 outputs a command to initialize the filter coefficient to filter initializer 107. Filter initializer 107 receives the command, which is output from threshold value comparator 105, and performs initialization by filter coefficients w[k]=0 in all taps (K=0 to T−1), that is, initializes all the taps of the filter coefficients w[k] with 0. Note that, for this initialization, values other than 0 may be used, and for example, numeric values determined based on a result of the incremental learning may be used.

Next, filter selector 108 selects an adaptive filter coefficient w[k] in which all the taps are updated to 0. Cancel signal generator 109 convolves the selected adaptive filter coefficient w[k] and the reference signal r[n−τ] with each other, thereby generating a cancel signal corresponding to the estimation signal e1[n] expressed by Expression (1.4). The cancel signal generated here is always 0 regardless of the value of the reference signal since all the taps of the filter coefficient w[k] are 0. Hence, cancel signal generator 109 may set the cancel signal to 0 without executing the convolution arithmetic operation.

Subtracter 110 subtracts a cancel signal, whose values are all 0, from the input signal m[n] of microphone 100. In this way, the speaker output signal of speaker 101 becomes completely equivalent to the input signal m[n] of microphone 100, and the speaker output signal and the reference signal r[n−τ], which have been abnormal, return to normal values. Then, in threshold value comparator 105, the average sound pressure level is prevented from exceeding the threshold value. As a result, the adaptive filter coefficient that is not 0 is updated in filter updater 106, and howling removing apparatus 120 can be self-restored to an operation of a howling canceller in a normal state.

2. Second Exemplary Embodiment

[2-1. Outline]

A howling removing apparatus and a howling removing method according to the second exemplary embodiment use a norm, which is calculated in the processing process of the ICA algorithm, also for the oscillation sensing of the adaptive filter. Specifically, the filter coefficient generator, which generates the adaptive filter that simulates the transfer characteristics of the space where the sound signal input to the microphone is reproduced from the speaker and is returned to the microphone, initializes the adaptive filter when the norm calculated in this processing process exceeds a threshold value. In this way, even when the positional relationship between the microphone and the speaker is dynamically changed, it becomes possible to sense the oscillation of the adaptive filter, and to restore the output to the normal. Moreover, the howling removing apparatus according to the second exemplary embodiment determines whether or not it is necessary to initialize the adaptive filter by using the norm obtained in the processing process of the ICA algorithm. This makes it possible to sense the oscillation of the adaptive filter and return the output to the normal without substantially increasing an arithmetic operation amount in order to determine whether or not it is necessary to initialize the adaptive filter.

A description will be made below of the second exemplary embodiment while referring to the drawings. Note that an operation of the ICA algorithm is the same as that of the first exemplary embodiment, and accordingly, a description thereof is omitted.

[2-2. Configuration and Operation of Howling Removing Apparatus in Second Exemplary Embodiment]

Figure 3:
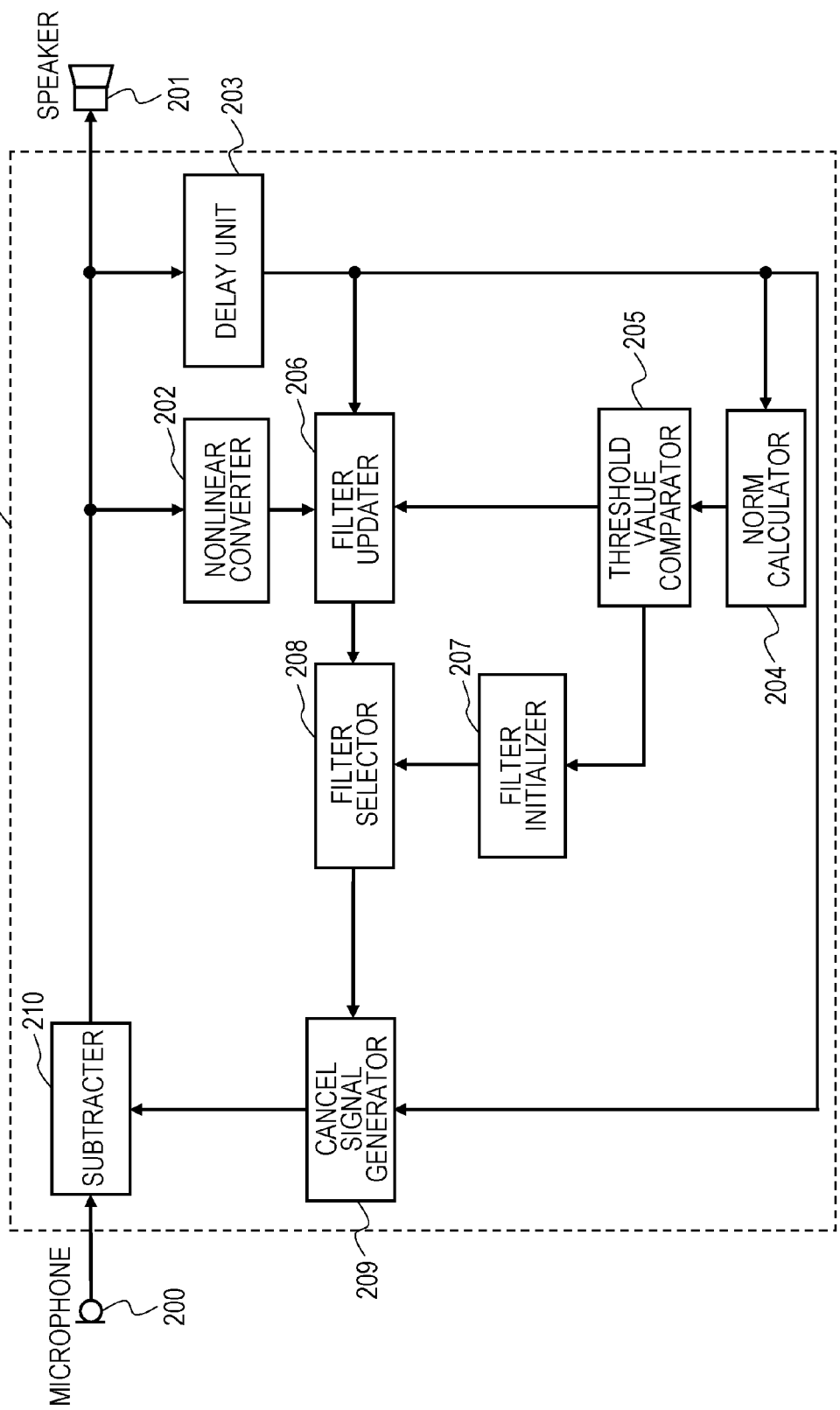
FIG. 3 is a block diagram showing a configuration of a howling removing apparatus in a second exemplary embodiment.

FIG. 3 is a block diagram showing a configuration of a howling removing apparatus in the second exemplary embodiment. Howling removing apparatus 220 includes: nonlinear converter 202; delay unit 203; norm calculator 204; threshold value comparator 205; filter updater 206; filter initializer 207; filter selector 208; cancel signal generator 209; and subtracter 210, and is connected to microphone 200 and speaker 201. Nonlinear converter 202, delay unit 203, norm calculator 204, filter updater 206, cancel signal generator 209 and subtracter 210 correspond to nonlinear converter 12, delay unit 13, norm calculator 14, filter updater 15, cancel signal generator 16 and subtracter 17, which are constituents of the ICA algorithm shown in FIG. 1, respectively. That is, howling removing apparatus 220 has a configuration, which is added with threshold value comparator 205, filter initializer 207, and filter selector 208 by applying the ICA algorithm.

The input signal m[n] of microphone 200 is input to subtracter 210. The signal (referred to as a speaker output signal) that has passed through subtracter 210 is input to speaker 201, nonlinear converter 202 and delay unit 203.

Nonlinear converter 202 implements the nonlinear conversion processing for the speaker output signal, and thereafter outputs a nonlinear output signal. Delay unit 203 outputs a delay signal (hereinafter, referred to as a reference signal) given an arbitrary time delay to the speaker output signal. Norm calculator 204 calculates a norm, which represents a sum of absolute values in an arbitrary unit time, with respect to the reference signal output from delay unit 203. In order to determine that the speaker output signal has an abnormal value, threshold value comparator 205 compares the norm, which is calculated by norm calculator 204, and a preset threshold value with each other. When the calculated norm is larger than the threshold value, threshold value comparator 205 determines that the speaker output signal has an abnormal value. When the filter coefficient oscillates and an abnormal operation occurs, noise of maximum amplitude is continuously reproduced as the speaker output signal. Therefore, when the abnormal operation occurs, the norm becomes substantially equal to a value obtained by multiplying an absolute value of the maximum amplitude by the unit time for calculating the norm. Meanwhile, also in a normal state, it is possible that the speaker output signal may momentarily take the maximum amplitude value; however, the speaker output signal does not take the maximum amplitude continuously for the unit time.

Hence, it is desirable to set the threshold value to a value at which the speaker output signal can be regarded to be in an abnormal state.

Hereinafter, the case where the norm is smaller than the threshold value and the case where the norm is larger than the threshold value will be described separately. When the norm is smaller than the threshold value, threshold value comparator 205 outputs the norm to filter updater 206. Filter updater 206 calculates a filter update value $\Delta w[k]$, which is expressed by Expression (1.6), by using the nonlinear output signal output by nonlinear converter 202, the reference signal that is the output of delay unit 203, and the norm that is the output of norm calculator 204, and then updates the adaptive filter coefficient w[k] expressed by Expression (1.5).

Next, filter selector 208 selects the updated adaptive filter coefficient w[k]. Cancel signal generator 209 convolves the selected adaptive filter coefficient w[k] and the reference signal $r[n-\tau]$ with each other, thereby generating a cancel signal corresponding to the estimation signal e1[n] expressed by Expression (1.4).

Next, as expressed in Expression (1.2), subtracter 210 subtracts the cancel signal (estimation signal) e1[n] from the input signal m[n] of microphone 200. In this way, the recirculated sound signal e[n], which is input to microphone 200 as a result that the speaker output signal of speaker 201 is transferred through the space, is almost removed from the input signal m[n] of microphone 200, and the occurrence of the howling can be prevented.

Subsequently, the case where the norm is larger than the threshold value in threshold value comparator 205 will be described. A fact that the norm is larger than the threshold value means that the reference signal $r[n-\tau]$ has an abnormal value in the time unit for calculating the norm. In this case, threshold value comparator 205 outputs a command to initialize the filter coefficient to filter initializer 207. Filter initializer 207 receives the command, which is output from threshold value comparator 205, and initializes all the taps of the filter coefficients w[k] with 0.

Next, filter selector 208 selects an adaptive filter coefficient w[k] in which all the taps are updated to 0. Cancel signal generator 209 convolves the selected adaptive filter coefficient w[k] and the reference signal $r[n-\tau]$ with each other, thereby generating a cancel signal corresponding to the estimation signal e1[n] expressed by Expression (1.4). The cancel signal generated here is always 0 regardless of the value of the reference signal since all the taps of the filter coefficient w[k] are 0. Hence, cancel signal generator 109 may set the cancel signal to 0 without executing the convolution arithmetic operation.

Subtracter 210 subtracts a cancel signal, whose values are all 0, from the input signal m[n] of microphone 200. In this way, the speaker output signal of speaker 201 becomes completely equivalent to the input signal m[n] of microphone 200, and the speaker output signal and the reference signal $r[n-\tau]$, which have been abnormal, return to normal values. Then, in threshold value comparator 205, the norm is prevented from exceeding the threshold value. As a result, the adaptive filter coefficient that is not 0 is updated in filter updater 206, and howling removing apparatus 120 can be self-restored to an operation of a howling canceller in a normal state.

[2-3. Effects and the Like]

Operation results in a PC simulation in the second exemplary embodiment will be described with reference to FIGS. 4, 5, and 6. Note that, in a usual operation, the output signal does not become abnormal, and the adaptive filter does not oscillate, and accordingly, the reference signal is forcibly multiplied by 128 in order to simulate the abnormal state.

Figure 4:
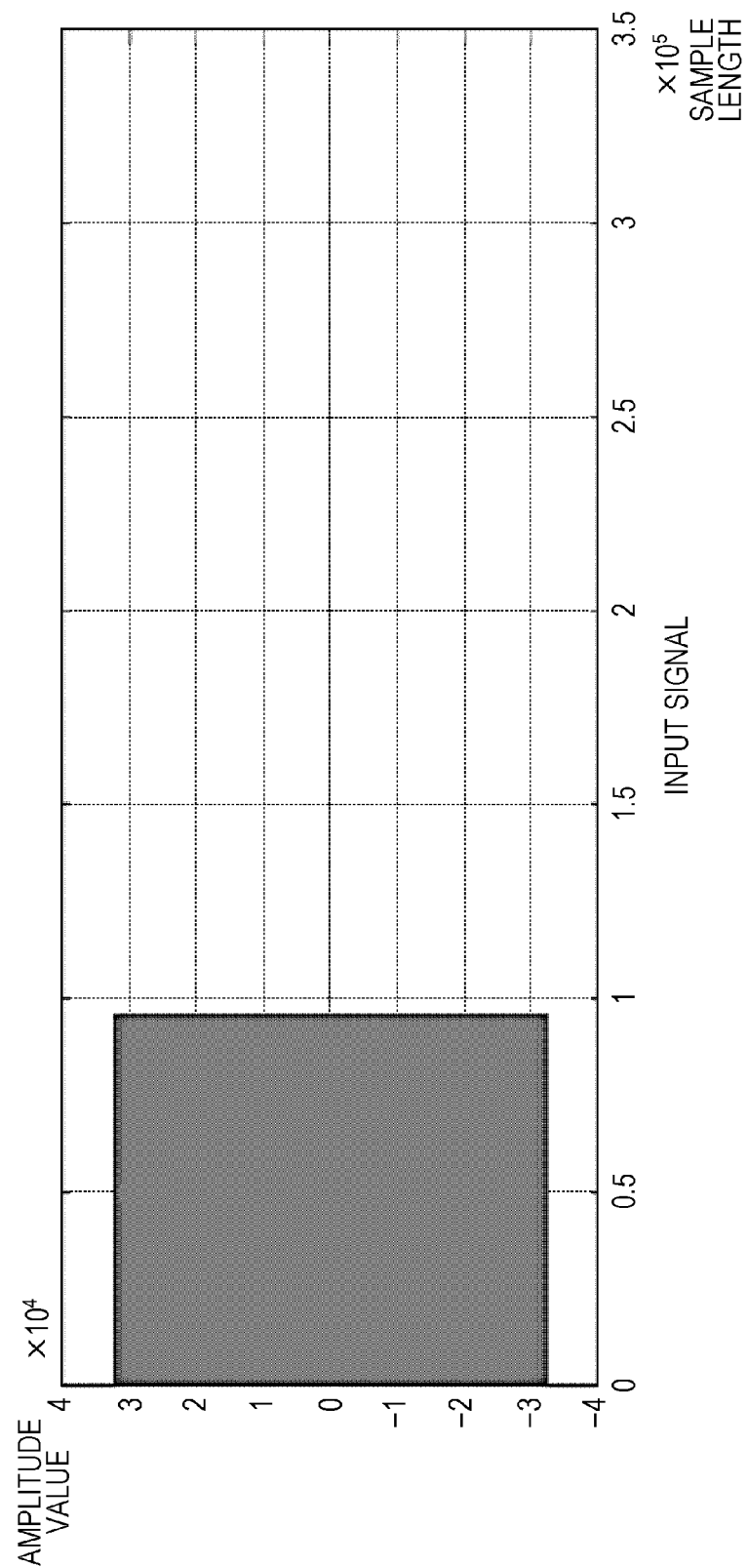
FIG. 4 is a graph showing a sound waveform of an input signal in a PC simulation in the howling removing apparatus according to the second exemplary embodiment.

FIG. 4 shows the input signal m[n] to microphone 200, in which a vertical axis represents an amplitude value, and a horizontal axis represents a sample length, and in this exemplary embodiment, a sampling frequency is 48000 Hz.

At this time, the input signal m[n] is a signal in which a sine wave with maximum amplitude at 16 bits is reproduced for $0.96 \times 10^5$ samples, that is, for 2 seconds, and thereafter, silence is reproduced for $2.4 \times 10^5$ samples, that is, for 5 seconds. That is, the input signal m[n] is a signal of $3.36 \times 10^5$ samples in total, that is, 7 seconds in total.

Figure 5:
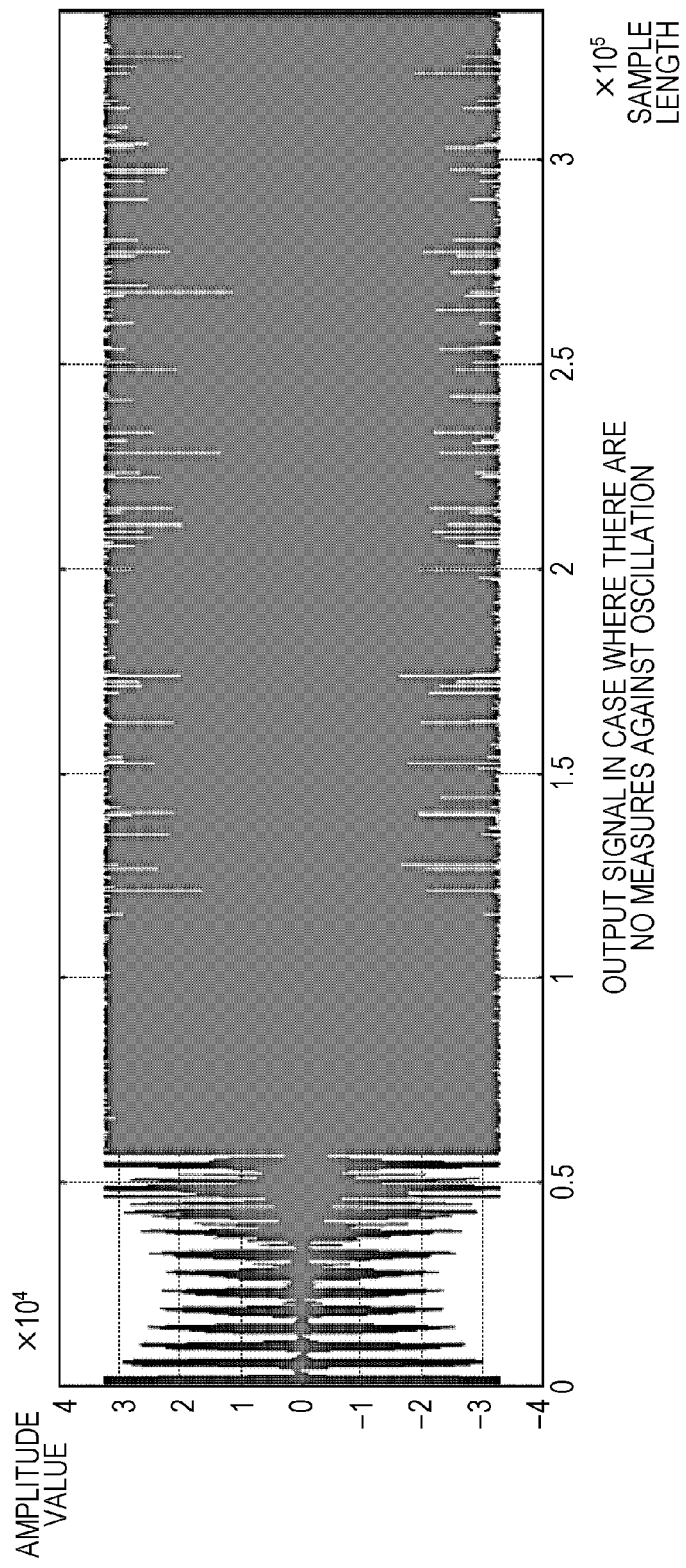
FIG. 5 is a graph showing a sound waveform of a speaker output signal in a PC simulation when the howling removing apparatus according to the second exemplary embodiment is not used.

FIG. 5 and FIG. 6 show speaker output signals when howling removing apparatus 220 according to the second exemplary embodiment is not used and when howling removing apparatus 220 according to the second exemplary embodiment is used, respectively. It is seen that, as shown in FIG. 5, when howling removing apparatus 220 according to the second exemplary embodiment is not used, the oscillation occurs after approximately $0.576 \times 10^5$ samples (approximately 1.2 seconds), and the noise of the maximum amplitude is reproduced. Moreover, the noise of the maximum amplitude continues to be output even after the input signal becomes silent.

Meanwhile, it is seen that, when howling removing apparatus 220 of the second exemplary embodiment is used, as shown in FIG. 6, the oscillation does not occur at a time when the oscillation has occurred (after approximately 1.2 seconds) in the case of no measures against the oscillation. Moreover, it is seen that, when the input signal becomes silent, the output signal also becomes 0 after approximately $0.24 \times 10^5$ samples (approximately 0.5 seconds), and there is no sound after that.

From the above results, it is seen that the howling removing apparatus according to the second exemplary embodiment operates effectively, whereby the noise of the maximum width does not continue to be output and becomes 0, and accordingly, the output can be self-restored from the abnormal state to the normal state.

Moreover, the howling removing apparatus according to the second exemplary embodiment determines whether or not it is necessary to initialize the adaptive filter by using the norm obtained in the processing process of the ICA algorithm. This makes it possible to sense the oscillation of the adaptive filter and return the output to the normal without substantially increasing the arithmetic operation amount in order to determine whether or not it is necessary to initialize the adaptive filter.

3. Other Exemplary Embodiments

As above, the first exemplary embodiment and the second exemplary embodiment have been described as illustration of the technology disclosed in the present application. However, the technology in the present disclosure is not limited to this, and is applicable also to exemplary embodiments, which are appropriately subjected to alteration, replacement, addition, omission, and the like. Moreover, it is also possible to form a new exemplary embodiment by combining the respective constituents described in the foregoing first exemplary embodiment with one another. Accordingly, other exemplary embodiment is illustrated below.

Respective functional blocks of the block diagrams (FIG. 1, FIG. 2, FIG. 3) are typically realized as an LSI that is an integrated circuit. Each of these may be individually formed into one chip, or these may be integrated into one chip so as to include a part or all of them. For example, functional blocks other than a memory may be integrated into one chip.

Though the integrated circuit is defined to be the LSI here, the integrated circuit is sometimes referred to as IC, system LSI, super LSI and ultra LSI depending on how a degree of integration differs.

Moreover, a method of forming an integrated circuit is not limited to the LSI, and the integrated circuit may be realized by a dedicated circuit or a general-purpose processor. A field programmable gate array (FPGA) that can be programmed after LSI fabrication or a reconfigurable processor capable of re-configuring connection and setting of circuit cells inside the LSI may be used.

Furthermore, if a technology for forming the integrated circuit, the technology replacing the LSI, appears due to advances in the semiconductor technology or other derived technologies, then as a matter of course, the functional blocks may be integrated by using the technology concerned. Application of biotechnology can be a possibility.

Moreover, among the respective functional blocks, only means for storing data to be encoded or decoded may be configured separately without being integrated into one chip.

Moreover, in the first exemplary embodiment described above, threshold value comparator 105 makes comparison as to whether or not the average sound pressure level of the speaker output signal is equal to or larger than the threshold value; however, threshold value comparator 105 may make comparison as to whether or not an average sound pressure level of the reference signal is equal to or more than the threshold value.

Moreover, in the second exemplary embodiment described above, in order to determine that the speaker output signal has an abnormal value, threshold value comparator 205 compares the norm, which is calculated by norm calculator 204, and the preset threshold value with each other. At this time, the norm calculated by norm calculator 204 is defined to represent the sum of the absolute values in the arbitrary unit time with respect to the reference signal output from delay unit 203; however, the norm is not limited to this. That is, in order to determine that the speaker output signal has an abnormal value, threshold value comparator 205 may compare the threshold value with a square root of an accumulated square sum of the reference signal output from delay unit 203.

The exemplary embodiments of the present invention have been described above with reference to the drawings; however, the present invention is not limited to the illustrated exemplary embodiments. Varieties of corrections and modifications can be made to the illustrated exemplary embodiments within the same scope as that of the present invention or within the scope of equivalents thereof.

Moreover, among the constituent elements described in the accompanying drawings and the detailed description, not only essential constituent elements but also inessential constituent elements can be included in order to illustrate the above-described technology. Therefore, it should not be immediately recognized that such inessential constituent elements are essential by the fact that the inessential constituent elements are described in the accompanying drawings and the detailed description.

Moreover, the above-mentioned exemplary embodiments exemplify the technology in the present disclosure, and accordingly, can be subjected to various types of alterations, substitutions, additions, omissions and the like within the scope of claims or equivalents thereof.

INDUSTRIAL APPLICABILITY

The present disclosure can be applied to an electronic instrument including a howling canceller using an adaptive filter. In particular, the present disclosure is effective for an electronic instrument in which a microphone and a speaker are present at positions close to each other.

What is claimed is:

1. A howling removing apparatus to be connected to a microphone and a speaker,
the howling removing apparatus comprising:
a nonlinear converter that nonlinearly converts a sound signal input to the speaker and outputs a nonlinear signal;
a delay unit that delays the sound signal by a fixed time and outputs a delay signal;
a norm calculator that calculates a norm from the delay signal;
a filter coefficient generator that generates, based on the nonlinear signal, the delay signal, and the norm, an adaptive filter that simulates a transfer characteristic of a space where the sound signal is reproduced from the speaker and is returned to the microphone;
a cancel signal generator that convolves the delay signal and the adaptive filter with each other and generates a cancel signal; and
a subtracter that subtracts the cancel signal from the sound signal,
wherein
the filter coefficient generator initializes the adaptive filter when an average sound pressure level of a signal that is based on the sound signal exceeds a threshold value.

2. The howling removing apparatus according to claim 1, wherein
the signal that is based on the sound signal is the sound signal or the delay signal.

3. The howling removing apparatus according to claim 1, wherein
the filter coefficient generator initializes the adaptive filter to set the adaptive filter to 0 or a predetermined value.

4. A howling removing apparatus to be connected to a microphone and a speaker,
the howling removing apparatus comprising:
a nonlinear converter that nonlinearly converts a sound signal input to the speaker and outputs a nonlinear signal;
a delay unit that delays the sound signal by a fixed time and outputs a delay signal;
a norm calculator that calculates a norm from the delay signal;
a filter coefficient generator that generates, based on the nonlinear signal, the delay signal, and the norm, an adaptive filter that simulates a transfer characteristic of a space where the sound signal is reproduced from the speaker and is returned to the microphone;
a cancel signal generator that convolves the delay signal and the adaptive filter with each other and generates a cancel signal; and
a subtracter that subtracts the cancel signal from the sound signal,
wherein
the filter coefficient generator initializes the adaptive filter when the norm exceeds a threshold value.

5. The howling removing apparatus according to claim 4, wherein
the norm is a sum of absolute values in a predetermined unit time in the delay signal.

6. A howling removing apparatus to be connected to a microphone and a speaker, the howling removing apparatus comprising:

a nonlinear converter that nonlinearly converts a sound signal input to the speaker and outputs a nonlinear signal;

a delay unit that delays the sound signal by a fixed time and outputs a delay signal;

a norm calculator that calculates a norm from the delay signal;

a filter coefficient generator that generates, based on the nonlinear signal, the delay signal, and the norm, an adaptive filter that simulates a transfer characteristic of a space where the sound signal is reproduced from the speaker and is returned to the microphone;

a cancel signal generator that convolves the delay signal and the adaptive filter with each other and generates a cancel signal; and a subtracter that subtracts the cancel signal from the sound signal, wherein the filter coefficient generator initializes the adaptive filter when a value indicative of a square root of an accumulated square sum of the delay signal exceeds a threshold value.

7. A howling removing method for a howling removing apparatus to be connected to a microphone and a speaker, the howling removing method comprising:

nonlinearly converting a sound signal input to the speaker and outputting a nonlinear signal;

delaying the sound signal by a fixed time and outputting a delay signal;

calculating a norm from the delay signal output from a delay unit;

generating, based on the nonlinear signal, the delay signal, and the norm, an adaptive filter that simulates a transfer characteristic of a space where the sound signal is reproduced from the speaker and is returned to the microphone;

convolving the delay signal and the adaptive filter with each other and generating a cancel signal; and subtracting the cancel signal from the sound signal, wherein the adaptive filter is initialized when at least one of an average sound pressure level of a signal that is based on the sound signal input to the speaker, the norm, and a value indicative of a square root of an accumulated square sum of the delay signal exceeds a threshold value.

* * * * *